United States Patent [19]

Whitney et al.

[11] 4,243,923

[45] * Jan. 6, 1981

[54] SERVO-CONTROLLED MOBILITY DEVICE

[75] Inventors: Daniel E. Whitney, Arlington; James L. Nevins, Jr., Burlington, both of Mass.

[73] Assignee: Massachusetts Institute of Technology, Cambridge, Mass.

[ * ] Notice: The portion of the term of this patent subsequent to May 29, 1996, has been disclaimed.

[21] Appl. No.: 5,483

[22] Filed: Jan. 22, 1979

Related U.S. Application Data

[63] Continuation of Ser. No. 474,342, May 29, 1974, Pat. No. 4,156,835.

[51] Int. Cl.[3] .............................................. G05B 13/00

[52] U.S. Cl. .................................... 318/561; 318/646; 318/648; 318/628; 364/105

[58] Field of Search ............... 318/561, 646, 648, 628; 364/105

[56] References Cited

U.S. PATENT DOCUMENTS

| | | | |
|---|---|---|---|
| 3,543,910 | 12/1970 | Devol | 198/34 |
| 3,548,172 | 12/1970 | Centner et al. | 318/561 |
| 3,622,767 | 11/1971 | Koepcke | 318/561 |
| 3,849,712 | 11/1974 | Lankford et al. | 318/561 |
| 4,156,835 | 5/1979 | Whitney et al. | 318/561 |

OTHER PUBLICATIONS

Of the ASME Paper No. 72-WA/AUT-4, 1972.

Beckett et al., "Controlling a Remote Manipulator with Aid of a Small Computer", ASME Paper No. 70–DE018, 1970.

"The Robot Revolution", *Machinery*, Aug. 1968, vol. 79, No. 12, pp. 63-67.

"Resolved Motion Rate Control of Manipulators and Human Prosthesis", Whitney, Daniel E., IEEE Transactions on Man-Machine Systems, vol. MMS-10, No. 2, Jun. 1969.

Whitney, D. E., "The Mathematics of Coordinated Control of Prosthetic Arms and Manipulators", Transactions.

*Primary Examiner*—Gene Z. Rubinson

*Assistant Examiner*—Eugene S. Indyk

*Attorney, Agent, or Firm*—Kenway & Jenney

[57] ABSTRACT

A servo system includes a servo loop incorporating an articulated mechanical arm or other controllable element, resolved motion rate control apparatus or other coordinate transformation apparatus, and an accommodation branch. The transfer characteristics may be readily adjusted to constrain the controllable element to accomplish a desired task, and the accommodation branch transfer characteristics may be readily modified to accomplish the performance of many different tasks without modifications to other portions of the system.

12 Claims, 5 Drawing Figures

SERVO-CONTROLLED MOBILITY DEVICE

This is a continuation of application Ser. No. 474,342, filed May 29, 1974 now U.S. Pat. No. 4,156,835.

PRIOR ART

Subsequent to World War II there have been extensive efforts to control automatically functions which previously required the continuous intervention or control of a human operator. Numerical Control Servo System, Forrester et al., U.S. Pat. No. 3,069,608, directed to digitally controlled apparatus, is an example of a sophisticated version of such techniques. However, techniques such as the Forrester digitally controlled milling machine resulted in so-called open-loop apparatus, that is, the apparatus traveled along a specified path, but interaction between the apparatus and its environment or objects along its path played no part in determining the course of the tool. Fundamentally similar industrial systems are now on the market in the form of American Machine Foundry's "Versatran" and Unimation Inc.'s "Unimate". These machines are all basically open-loop machines under the control of pre-programmed instructions with minimal, if any, feedback. They may, for example, employ some feedback to stop further motion when the head comes into position to make, for example, a desired weld.

Certain researchers began to realize that a more sophisticated system was necessary if every application was not to involve very specific, specialized predesigned programming. At Massachusetts Institute of Technology's Draper Laboratory extensive work was done upon systems involving force and torque feedbacks to "steer" a mechanical arm or hand to provide desired functions. For example the Master of Science thesis of Roland C. Groome Jr., (Massachusetts Institute of Technology, 1972, also available as MIT C.S. Draper Laboratory report T-575) based upon work done under Mr. James L. Nevins at the Draper Laboratory, describes in considerable detail a system involving force steering loops to control an Argonne National Laboratories Model E-2 manipulator, a device having six different degrees of freedom. The apparatus is capable of functions such as inserting a half-inch diameter peg into a hole with a clearance between the peg and the hole of only approximately five thousandths of an inch. It became apparent, however, that even apparatus such as Groome's involved considerable design that was specific to a given task.

THE PRESENT INVENTION

Accordingly it is an object of the present invention to achieve motion control apparatus which is adapted to the performance of many different tasks through easily performable modifications to a single portion of the control apparatus.

A further object is to achieve motion control apparatus wherein changes in the environment or modifications to the sensing apparatus may be readily incorporated without modifying other parts of the system. A further object is to provide a motion control system which may be easily applied to mechanical arms or other controllable motion apparatus through easily accomplished system adjustments. A further object is to achieve motion control apparatus in which each part of the system may be dealt with in its own natural or most convenient coordinates, including the coordinates of the environment, so as to facilitate achievement of the above objectives.

These and other objects of the invention are achieved in a servo system which includes a servo loop incorporating the controllable element, resolved motion rate control apparatus or other coordinate transformation apparatus as appropriate, and an accommodation branch, all of whose transfer characteristics may be readily adjusted to constrain the controllable element to accomplish a desired task.

DRAWINGS

DETAILED DESCRIPTION OF THE INVENTION

Figure 1:
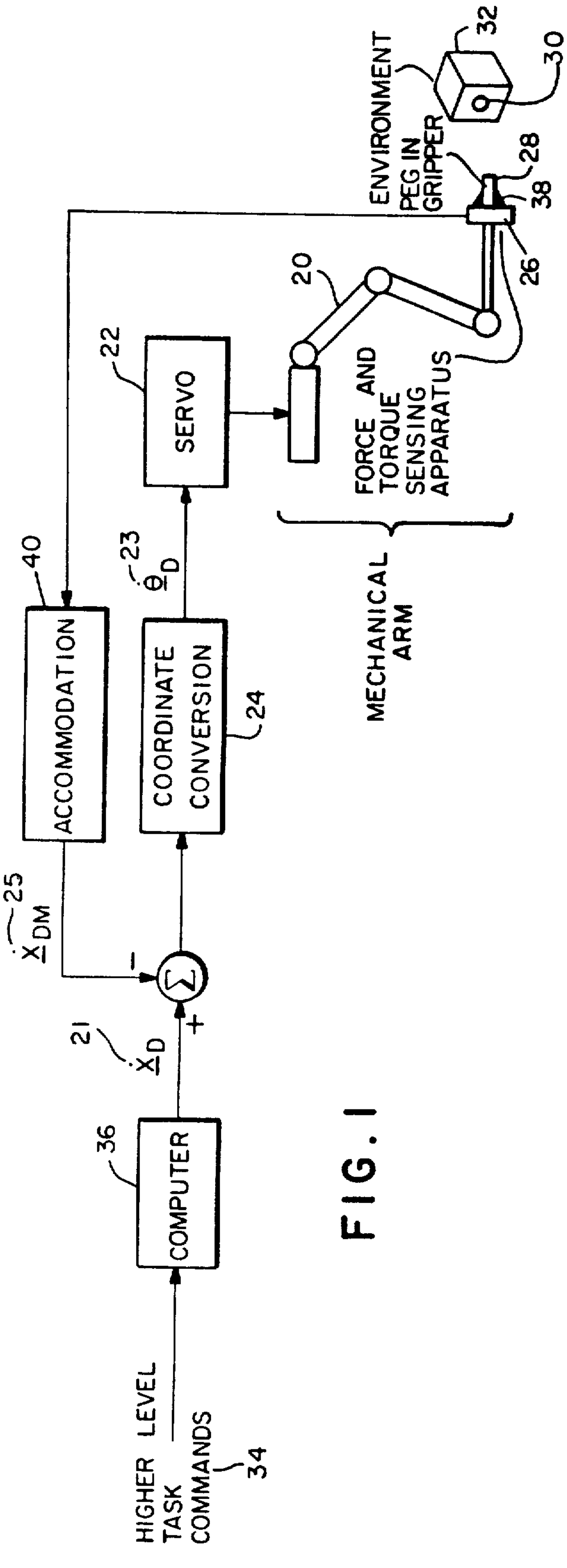
FIG. 1 is a schematic representation of a system embodiment incorporating a mechanical arm.

FIG. 1 shows schematically the physical elements of an example system constructed according to the above objectives, carrying out an example task. It consists of a controllable motion device 20, namely an Argonne arm, a servo 22 to drive that arm, coordinate conversion apparatus 24, force and torque sensing apparatus 26 at or near the end of the arm, (such sensing apparatus could be located in the environment, or sensory apparatus could be located both on the controlled element and in the environment), a peg 28 grasped by the arm, and a hole 30 in a block located in the environment 32. Higher lever task commands 34 indicate to the computer 36 that the peg 28 is to be put in the hole 30. Commands $\dot{x}_D$(21) represent velocity commands expressed in the coordinate system of the arm's gripper 38, and are designed to drive the peg to the mouth of the hole 30. The coordinate conversion apparatus 24 converts these commands into $\dot{\theta}_D$(23), the desired commands expressed in the coordinates of the degrees of freedom of the arm. When the tip of the peg hits the mouth of the hole, forces and torques are exerted on the peg. These forces and torques are sensed by the sensing apparatus and expressed in the coordinates of the gripper. The sensing apparatus signals are sent to the accommodation branch 40 which, according to task related logic, generates velocity modification commands $\dot{x}_{DM}$(25) in gripper coordinates. The net velocity commands are then converted, as before, into motion commands in the controllable degrees of freedom of the arm. In some systems constructed according to these principles, the computer 36 may perform the accommodation, force sensor processing, coordinate conversion and/or servo functions, but this is not necessary.

Figure 2:
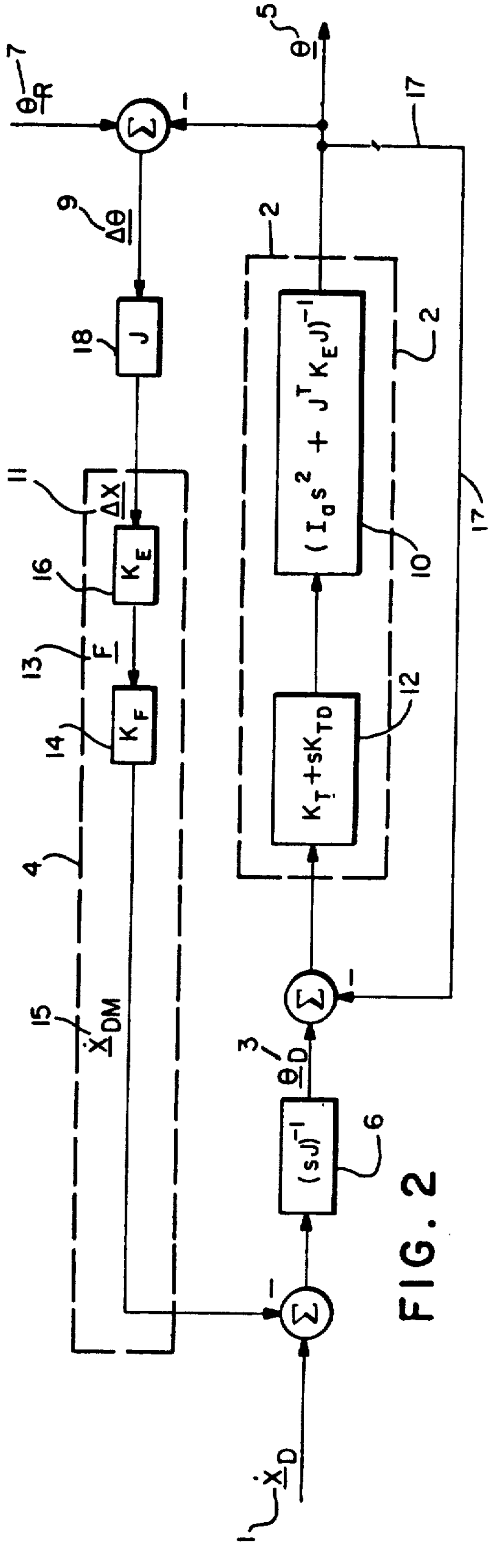
FIG. 2 is a mathematical model of a system embodiment incorporating a mechanical arm.

FIG. 2 shows a mathematical model of a servo controlled motion device is elastic contact with a generalized environment. This model is useful for designing such systems and understanding their behavior. That portion of the system within the dotted box 2 represents the controllable motion device with its control and transfer function terms representing the controllable element, the environment and the sensing device. That portion within the dotted box 4 represents the accommodation branch which includes transfer functions which will constrain the system's operation to achieve the desired task, along with functions which mathematically represent the environment and the sensing device characteristics. Box 6 represents a resolved motion rate controller which serves to produce signals appropriate to the desired task motion when its output is applied to a controllable motion device of an articulated nature, or other complex motion device. If the motion device is particularly simple, the coordinate conversions accomplished by box 6 may not be necessary.

The various portions of the servo system of FIG. 2 will now be discussed in greater detail. Box 10 contains a typical transfer function which mathematicaly represents the controllable element–for example, a mechanical arm such as the Argonne arm–interacting elastically with its environment. (Other types of interaction impedance could be utilized, but this interaction is used as an example.) $I_a$ represents the inertia matrix of the controllable element while $K_E$ represents the sitffness matrix of the force sensors and the environment. If, for example, an Argonne arm is used as a controllable element, matrix $I_a$ may be calculated as set forth in Kahn, M. E., "The Near Minimum-Time Control of Open Loop Articulated Kinematic Chains," Ph.D. Thesis, Stanford University, 1970. (Available from Xerox University Microfilms, Ann Arbor, Michigan, order No. 70-18425.) $I_a$ is expressed in the coordinates of the controllable degrees of freedom of the arm. Matrix $K_E$ is calculated as set forth in Appendix 1, and is expressed in this example in the coordinates of the gripper to which the sensor is attached. The remaining terms in box 10 are the Laplace operator s, the matrix J representing the resolved motion rate control function and superscript T representing matrix transpose. Matrix J may be calculated as set forth in Whitney, D. E., "The Mathematics of Coordinated Control of Prosthetic Arms and Manipulators", *ASME Journal of Dynamic Systems, Measurement and Control,* December, 1972, pp. 303–309.

Figure 3:
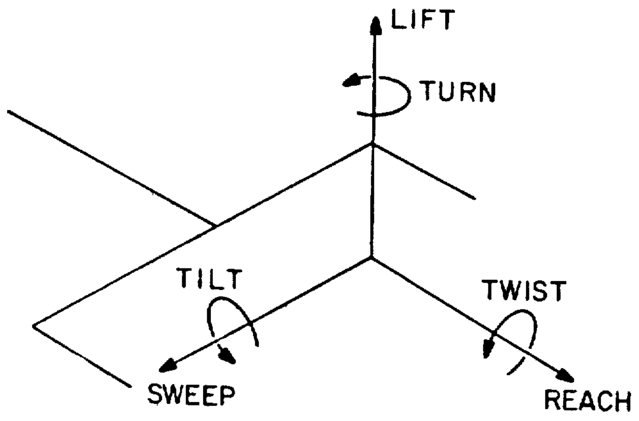
FIG. 3 is a schematic representation of coordinates for a gripper for use in the system of FIGS. 1 or 2.

Box 6 performs the resolved motion rate control function and acts to convert a vector of motion commands $\dot{x}_D$(1) or $\dot{x}_{DM}$(15) (expressed in task-related coordinates) into commands to the controllable degrees of freedom of the motion device (for example an Argonne arm) so that the desired motions of the controllable motion device will occur. (In FIG. 2 these motions are expressed in the coordinates of the controllable degrees of freedom of the motion device ($\theta$) (5) for mathematical convenience.) FIG. 3 shows schematically a typical gripper for an arm such as the Argonne arm with a typical set of coordinates attached to it.

Block 12 contains a typical servo for an arm such as the Argonne arm. This helps determine the response of the controllable element servo loop. Matrices $K_T$ and $K_{TD}$ are chosen to provide the type of characteristics which the servo loop will exhibit. For example, one may adjust or tune the servo to control the sensitivity and rate at which a particular task is accomplished. The coefficients are calculated as set forth in Nevins, J. L., Whitney, D. E., and Simunovic, S. N., "System Architecture for Assembly Machines", C.S. Draper Laboratory Inc. Report No. R-764, pp. 39–53. In some are mechanizations, the actuators may be sufficiently responsive so that the servo loop closed around box 2 and the servo apparatus in box 12 are not needed, or are substantially simplified. In other cases, more complex servo apparatus may be needed in box 12, and should be designed according to the art of servo control design.

Considering now the accommodation branch in dotted box 4, the task logic which determines the way the controllable element will be constrained to perform a task is determined by the transfer function in box 14. If the controllable motion device is an Argonne arm, F(13) is a vector of forces and torques applied to the gripper by the environment. Matrix $K_F$ is an admittance matrix which receives input F(13) and converts it into velocity modifications vector $\dot{x}_{DM}$(15), both expressed in gripper coordinates. Force and torque vector F arises from deformations $\Delta$x (11) which occur in the environment and in the force sensor as a result of contact between the controllable element and the environment. $\Delta$x is also expressed in gripper coordinates. For mathematical convenience, this deformation is shown in FIG. 2 as $\Delta\theta$ (9), its equivalent in the coordinates of the controllable degrees of freedom of the controllable element. Matrix J in box 18 is the same as the matrix which is used in box 6. Box 18 is part of the mathematical model only and has no counterpart in a physical system. The coordinates of the environment are also shown for mathematical convenience in the coordinates of the controllable element as vector $\theta_R$(7). The sign conventions in this branch are such that, if $K_F$ is taken to be the identity matrix, then if a force vector F (13) is applied to the gripper, the vector $\dot{x}_{DM}$(15) will be exactly parallel to and proportional to vector F. Matrix $K_E$ (Box 16) is the same as the matrix $K_E$ which appears in box 10. It mathematically models the force-deformation characteristics of the sensor and the environment.

The calculation of matrix $K_F$ is considerably eased by the fact that its input and output are both in gripper coordinates. $K_F$ may be calculated as set forth for example in Nevins, J. L., and Whitney, D. E., "The Force Vector Assembler Concept," MIT C.S. Draper Lab. Report No. E-2754, the admittance matrix shown therein serving as $K_F$ for a system designed to put a peg in a hole as shown at page 13 of Nevins and Whitney. As set forth in this report, it is assumed that the gripper coordinates are velocities as follows:

$$\dot{x} = \frac{d}{dt}\begin{bmatrix}\text{Reach}\\ \text{Sweep}\\ \text{Lift}\\ \text{Twist}\\ \text{Tilt}\\ \text{Turn}\end{bmatrix}$$

and that the desired task is to put a peg in a hole starting from a point where the peg is in the mouth of the hole but is misaligned. The task logic is to use the forces and torques created by a command in the reach direction to create velocity modifications which will tend to correct the misalignment. Therefore, set $$\dot{x}_D = \begin{bmatrix}\text{Reach}\\ 0\\ 0\\ 0\\ 0\\ 0\end{bmatrix}$$

and let $K_F$ be the matrix $$\begin{bmatrix} -1 & 0 & 0 & 0 & 0 & 0 \\ 0 & -100 & 0 & 0 & 0 & 0 \\ 0 & 0 & -100 & 0 & 0 & 0 \\ 0 & 0 & 0 & -100 & 0 & 0 \\ 0 & 0 & 0 & 0 & -100 & 0 \\ 0 & 0 & 0 & 0 & 0 & -100 \end{bmatrix}$$

This matrix will cause motions other than reach to occur in accommodation to the cross forces and torques caused by misalignment. However, the 1 in the upper left corner of the matrix (in Report E-2754, the sign of this 1 is incorrect) will cause little modification to the reach motion unless forces sensed in the reach direction become extremely high, such as when the peg bottom in the hole, at which point motion will stop. Except for the zeroes, the quantities in the matrices set forth in the specification are representatives and may be adjusted along with command vector $\dot{x}_D$ to modify the precise characteristics of system performance, including the overall servo dynamics, the force levels at which motion will commence or cease, and so on. The sign conventions may also be adjusted at will, so long as the accommodation branch and the remainder of the apparatus remain a stable dynamic system.

In some mechanizations of such systems, it will be convenient or appropriate to observe the motions of the arm via sensors on the arm or in the environment, and compose torque or force commands to the arm's actuators according to similar task related logic. This will be useful in such tasks as stretching springs or cables to a specified degree of deformation. In other mechanizations, it will be useful or convenient to sense the forces and torques applied to the arm by the environment and compose force or torque commands to the arm via an accommodation branch according to task related logic. This will be useful in such tasks as applying desired force or torque patterns. In each case if the driving components or arm have a response sufficiently precisely related to the command inputs it may be unnecessary to have the feedback connection 17 shown in FIG. 2, in which case servo 12 may be substantially simplified or altered.

Figure 5:
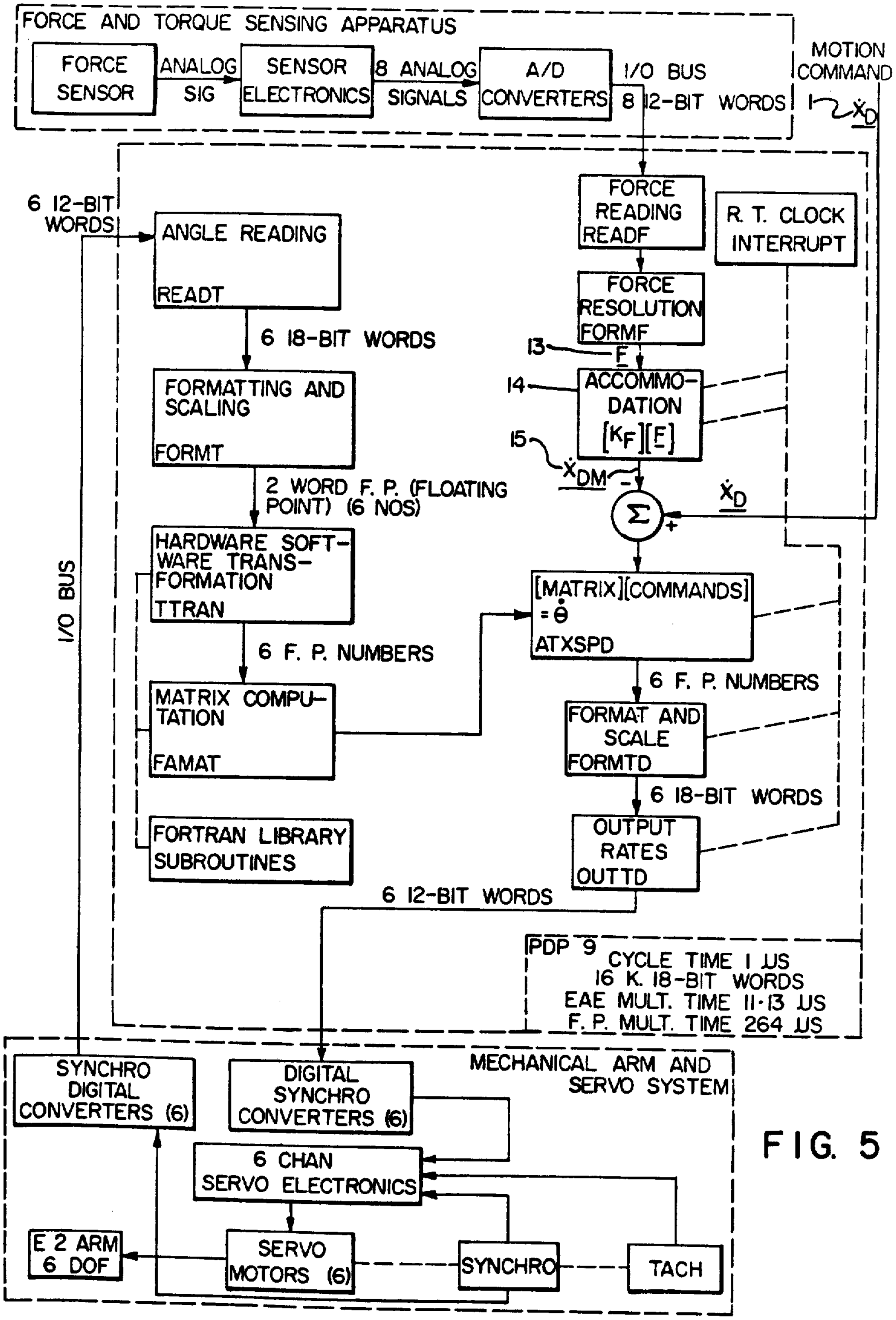
FIG. 5 is a schematic representation of an embodiment of the systems of FIGS. 1 and 2.

FIG. 5 shows in block diagram form a detailed embodiment of the system of FIG. 1, which also corresponds to the mathematical model shown in FIG. 2. The computer subroutines indicated in FIG. 5 are shown in Appendix II.

APPENDIX 1 - Calculation of $K_E$

Matrix $K_E$ represents the stiffness of the force sensing apparatus and the environment, and is defined mathematically by the relation $$K_E=[C_S+C_{EN}]^{-1}$$

where $C_S$ represents the compliance of the sensor and $C_{EN}$ represents the compliance of the environment. We shall pursue here the case where the environment is, relative to the sensor, infinitely stiff, so that $C_{EN}=0$. Then $K_E=K_S=C_S^{-1}$.

Figure 4:
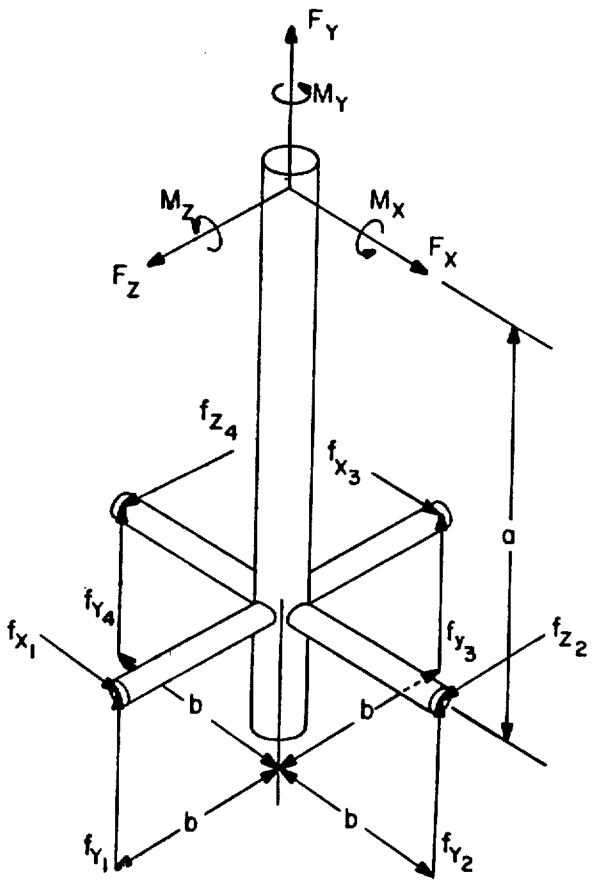
FIG. 4 is a schematic representation of force components for a force sensor for use in the system of FIGS. 1 or 2.

The stiffness matrix $K_S$ of the force sensor shown schematically in FIG. 4 and discussed in Groome has, be design, the form $$K_s = C_s^{-1} = \begin{bmatrix} K_{xx} & 0 & 0 & 0 & 0 & 0 \\ 0 & K_{yy} & 0 & 0 & 0 & 0 \\ 0 & 0 & K_{zz} & 0 & 0 & 0 \\ 0 & 0 & 0 & K_{\theta x} & 0 & 0 \\ 0 & 0 & 0 & 0 & K_{\theta y} & 0 \\ 0 & 0 & 0 & 0 & 0 & K_{\theta z} \end{bmatrix}$$

This is a diagonal matrix. The meaning of each entry is:

| | |
|---|---|
| $K_{xx} = \frac{F_x}{\delta_x}$ | [units of force/displacement] |
| $K_{yy} = \frac{F_y}{\delta_y}$ | [units of force/displacement] |
| $K_{zz} = \frac{F_z}{\delta_z}$ | [units of force/displacement] |
| $K_{\theta x} = \frac{M_x}{\theta_x}$ | [units of moment/angular displacement in radians] |
| $K_{\theta y} = \frac{M_y}{\theta_y}$ | [units of moment/angular displacement in radians] |
| $K_{\theta z} = \frac{M_z}{\theta_z}$ | [units of moment/angular displacement in radians] |

$F_x$, $F_y$, $F_z$, $M_x$, $M_y$, $M_z$ are defined in FIG. 4 and comprise the force vector applied to a point on the sensor when it contacts the environment, and is the force vector which the sensor is intended to measure, $\delta_x$, $\delta_y$ and $\delta_z$ are linear displacements of this contact point relative to the base of the sensor, while $\theta_x$, $\theta_y$ and $\theta_z$ are relative angular displacements. These displacements occur when the force vector is applied at the contact point and is counterbalanced by forces and moments which support the base of the sensor, the latter being held by the controllable element or arm. In FIG. 4, the contact point is a distance "a" from the base, as shown. The four bars of length "b" shown in this figure will deform elastically and counterbalance the applied force vector. Following the principles of structural analysis (see for example Crandall and Dahl, editors, "Introduction to the Mechanics of Solids", McGraw Hill, 1959, Chapter 8) one may calculate the entries in matrix $K_S$, assuming that each bar of length "b" has an area moment I and a Young's modulus E, with these results:

$$K_{xx} = \frac{6\,EI}{b^3}$$

$$K_{yy} = \frac{12\,EI}{b^3}$$

$$K_{zz} = K_{xx}$$

$$K_{\theta x} = \frac{12\,(a^2+b^2)\,EI}{b^3}$$

$$K_{\theta y} = \frac{12\,EI}{b}$$

$$K_{\theta z} = K_{\theta x}$$

The formulae for $K_{\theta x}$ and $K_{\theta x}$ are obtained on the assumption that b is substantially less than a, the usual case for the device shown in FIG. 4. When any such device is built, it is advisable to determine the entries of $K_S$ experimentally as well as theoretically, to determine their values and the degree to which the intended diagonality of $K_S$ has been achieved. To do this, one must physically apply known loads and movements and, by means of suitable guages, measure the resulting displacements.

APPENDIX II

```
    #SYSV3 SRC         FORCE STEERING CONTROL PROGRAM
                                /
 1                              /         .TITLE  FORCE STEERING CONTROL PROGRAM
 2                              / ACCUMULATOR SWITCH DESIGNATIONS:
 3                              /         0         INITIALIZATION
 4                              /         1         FORCE CALIBRATION
 5                              /         2         BIAS COMPUTATION
 6                              /         3         PRINT ANGLES
 7                              /         4         PRINT JACOBIAN
 8                              /         5         PRINT INVERSE JACOBIAN
 9                              /         6         FORCE BIAS COMP
10                              /         7         TURN OFF FORCE STEERING LOOP
11                              /         8         PASSIVE ARM
12                              /         9         OUTPUT SCALING
13                              /         10          "
14                              /         11          "
15                              /         12        DISPLAY SELECTION: 0=TP   1=F
16                              /         13                 "         2=FORCE  3=TOL
17                              /         14                 "         4=TDP
18                              /         15        DISPLAY CHANNEL NUMBER
19                              /         16          "
20                              /         17          "
21                              /         .GLOBL COMM,TTRAN,FAMAT
22                              /         SYMBOLIC ASSIGNMENTS
23              705032 A                  INAX1=705032
24              705052 A                  INAX2=705052
25              705072 A                  INAX3=705072
26              705212 A                  INAX4=705212
27              705232 A                  INAX5=705232
28              705252 A                  INAX6=705252
29              705272 A                  INAX7=705272
30              705024 A                  OUTAX1=705024
31              705044 A                  OUTAX2=705044
32              705064 A                  OUTAX3=705064
33              705204 A                  OUTAX4=705204
34              705224 A                  OUTAX5=705224
35              705244 A                  OUTAX6=705244
36              705264 A                  OUTAX7=705264
37              705004 A                  OUTMOD=705004
38              705002 A                  UPDTAX=705002
39              701301 A                  ADSF=701301
40              701312 A                  ADHB=701312
41              701103 A                  ADSM=701103
42              700002 A                  IOF=700002
43              700042 A                  ION=700042
44              700044 A                  CLON=700044
45              700004 A                  CLOF=700004
46              702105 A                  RELBUF=702105
47              757575 A                  EOS=757575
48                              /
49                              /
50                              /
51                                        .TIMER  8,CLOOP
       00000 R 000000 A  *G               CAL
       00001 R 000014 A  *G               14
       00002 R 000015 R  *G               *0+100000+CLOOP
                         *G               .DEC
                         /
       00003 R 777770 A  *G               -8
52     00004 R 100425 R                   JMS    SETTSK
53     00005 R 750004 A        BGRND      LAS
54     00006 R 502662 R                   AND    (400000  /INITIALIZE SWITCH
55     00007 R 740200 A                   SZA
56     00010 R 100310 R                   JMS    POSIT
57     00011 R 100131 R                   JMS    READT    /BACKGROUND PROGRAMS
58     00012 R 100160 R                   JMS    FORMT
59     00013 R 122660 E                   JMS*   FAMAT
```

```
00014 R 600005 R            JMP     BGRND
                    /
                    /
00015 R 740000 A    CLOOP   NOP                 /INTERRUPT PROGRAMS
00016 R 042175 R            DAC     ACSAVE
00017 R 641002 A            LACQ
00020 R 042176 R            DAC     MQSAVE
00021 R 750004 A            LAS
00022 R 502663 R            AND     (002000 /TURN OFF FORCE LOOP
00023 R 740200 A            SZA
00024 R 600062 R            JMP     CLOOP3
00025 R 100530 R            JMS     READF
00026 R 100613 R            JMS     FORMF
00027 R 750004 A            LAS
00030 R 502664 R            AND     (200000 /FORCE CALIBRATION
00031 R 740200 A            SZA
00032 R 600060 R            JMP     CLOOP2
00033 R 100713 R            JMS     STMON
00034 R 101014 R    CLOOP4  JMS     STEER
00035 R 101157 R            JMS     ATXSPD
00036 R 101612 R            JMS     FORMTD
00037 R 101763 R            JMS     OUTTD
00040 R 100072 R    CLOOP1  JMS     DATMON
00041 R 202177 R            LAC     SCSAVE  /RESTORE ALL REGS
00042 R 242665 R            XOR     (77
00043 R 342666 R            TAD     (640402
00044 R 502667 R            AND     (640477
00045 R 040046 R            DAC     .+1
00046 R 740040 A            XX
00047 R 202176 R            LAC     MQSAVE
00050 R 652000 A            LMQ
00051 R 777770 A            LAW     -10
00052 R 062670 R            DAC*    (7
00053 R 200015 R            LAC     CLOOP
00054 R 740010 A            RAL
00055 R 202175 R            LAC     ACSAVE
00056 R 700044 A            CLON
00057 R 620015 R            JMP*    CLOOP
00060 R 100435 R    CLOOP2  JMS     STPRAT
00061 R 600040 R            JMP     CLOOP1
00062 R 777772 A    CLOOP3  LAW     -6
00063 R 042146 R            DAC     X1I
00064 R 202671 R            LAC     (FORCE
00065 R 042147 R            DAC     X2I
00066 R 162147 R            DZM*    X2I
00067 R 442146 R            ISZ     X1I
00070 R 600066 R            JMP     .-2
00071 R 600034 R            JMP     CLOOP4
                    /
                    /
                    /
                    /
                    //..............BACKGROUND PROGRAMS.............
                    /
                    /
                    /
                    /
00072 R 740000 A    DATMON  NOP                 /DATA DISPLAY ROUTINE
00073 R 750004 A            LAS
00074 R 502672 R            AND     (70
00075 R 542673 R            SAD     (0
00076 R 600110 R            JMP     RA00
00077 R 542674 R            SAD     (10
00100 R 600112 R            JMP     RA01
00101 R 542675 R            SAD     (20
00102 R 600114 R            JMP     RA02
00103 R 542676 R            SAD     (30
00104 R 600116 R            JMP     RA03
00105 R 542677 R            SAD     (40
00106 R 600120 R            JMP     RA04
00107 R 620072 R            JMP*    DATMON
00110 R 202700 R    RA00    LAC     (TP-1
```

```
00111 R 600121 R            JMP     RA
00112 R 202701 R   RA01     LAC     (F
00113 R 600121 R            JMP     RA
00114 R 202702 R   RA02     LAC     (FORCE-1
00115 R 600121 R            JMP     RA
00116 R 202703 R   RA03     LAC     (TDL-1
00117 R 600121 R            JMP     RA
00120 R 202704 R   RA04     LAC     (TDP-1
00121 R 042132 R   RA       DAC     TMP
00122 R 750004 A            LAS
00123 R 502670 R            AND     (7
00124 R 342132 R            TAD     TMP
00125 R 042132 R            DAC     TMP
00126 R 222132 R            LAC*    TMP
00127 R 702105 A            RELBUF
00130 R 620072 R            JMP*    DATMON
                   /
                   /
                   /
                   /
00131 R 740000 A   READT    NOP             /READ RESOLVER ANGLES
00132 R 705032 A            INAX1
00133 R 342114 R            TAD     AX1B    /ADD BIAS
00134 R 042043 R            DAC     TP
00135 R 705052 A            INAX2
00136 R 342115 R            TAD     AX2B
00137 R 042044 R            DAC     TP+1
00140 R 705072 A            INAX3
00141 R 342116 R            TAD     AX3B
00142 R 042045 R            DAC     TP+2
00143 R 705212 A            INAX4
00144 R 342117 R            TAD     AX4B
00145 R 042046 R            DAC     TP+3
00146 R 705232 A            INAX5
00147 R 342120 R            TAD     AX5B
00150 R 042047 R            DAC     TP+4
00151 R 705252 A            INAX6
00152 R 342121 R            TAD     AX6B
00153 R 042050 R            DAC     TP+5
00154 R 705272 A            INAX7
00155 R 342122 R            TAD     AX7B
00156 R 042051 R            DAC     TP+6
00157 R 620131 R            JMP*    READT
                   /
                   /
                   /
                   /
00160 R 740000 A   FORMT    NOP
00161 R 202705 R            LAC     (TP     /INITIALIZE REGS
00162 R 042142 R            DAC     X1
00163 R 202706 R            LAC     (REST
00164 R 042143 R            DAC     X2
00165 R 202707 R            LAC     (TPO
00166 R 042144 R            DAC     X3
00167 R 202710 R            LAC     (RFLG
00170 R 042145 R            DAC     X4
00171 R 777772 A            LAW     -6
00172 R 042135 R            DAC     COUNT
00173 R 222142 R   LOOP3    LAC*    X1
00174 R 502150 R            AND     B0      /CHECK BIT 0 OF (
00175 R 042152 R            DAC     NOWB0   /WORD
00176 R 222144 R            LAC*    X3
00177 R 502150 R            AND     B0
00200 R 542152 R            SAD     NOWB0
00201 R 600230 R            JMP     SAMREG  /SAME ZONE
00202 R 222145 R            LAC*    X4      /BIT ZERO CHANGE(
00203 R 741100 A            SPA
00204 R 600227 R            JMP     REG3
00205 R 740200 A            SZA
00206 R 600225 R            JMP     REG2
00207 R 222142 R   REG1     LAC*    X1
00210 R 740010 A            RAL
00211 R 502150 R            AND     B0
00212 R 542152 R            SAD     NOWB0
```

```
00213 R 600230 R            JMP     SAMREG  /SAME ZONE
00214 R 222142 R            LAC*    X1
00215 R 502151 R            AND     B1
00216 R 740200 A            SZA
00217 R 600222 R            JMP     R13     /CHANGE TO ZONE :
00220 R 462145 R            ISZ*    X4      /CHANGE TO ZONE ;
00221 R 600230 R            JMP     SAMREG
00222 R 750001 A    R13     CLC
00223 R 062145 R            DAC*    X4
00224 R 600230 R            JMP     SAMREG
00225 R 162145 R    REG2    DZM*    X4      /CHANGE TO ZONE 1
00226 R 600230 R            JMP     SAMREG
00227 R 162145 R    REG3    DZM*    X4      /CHANGE TO ZONE 1
00230 R 222142 R    SAMREG  LAC*    X1
00231 R 062144 R            DAC*    X3      /UPDATE TPO
00232 R 222145 R            LAC*    X4
00233 R 741100 A            SPA
00234 R 600244 R            JMP     FOR3
00235 R 741200 A            SNA
00236 R 600254 R            JMP     FOR1
00237 R 222142 R    FOR2    LAC*    X1      /FORMAT DATA FOR ZONE 2
00240 R 744020 A            RCR
00241 R 162143 R            DZM*    X2
00242 R 442143 R            ISZ     X2
00243 R 600275 R            JMP     FLOAT
00244 R 222142 R    FOR3    LAC*    X1      /FORMAT DATA FOR ZONE 3
00245 R 740001 A            CMA
00246 R 342711 R            TAD     (1
00247 R 744020 A            RCR
00250 R 242150 R            XOR     B0
00251 R 162143 R            DZM*    X2
00252 R 442143 R            ISZ     X2
00253 R 600275 R            JMP     FLOAT
00254 R 222142 R    FOR1    LAC*    X1      /FORMAT DATA FOR ZONE 1
00255 R 744000 A            CLL
00256 R 660501 A            LRSS    1
00257 R 740100 A            SMA
00260 R 600262 R            JMP     NORMAL
00261 R 740001 A            CMA
00262 R 650000 A    NORMAL  CLQ
00263 R 744000 A            CLL
00264 R 640444 A            NORM
00265 R 042153 R            DAC     TMPT
00266 R 641001 A            LACS
00267 R 342712 R            TAD     (-35
00270 R 740001 A            CMA
00271 R 062143 R            DAC*    X2
00272 R 442143 R            ISZ     X2
00273 R 202153 R            LAC     TMPT
00274 R 242152 R            XOR     NOW80
00275 R 062143 R    FLOAT   DAC*    X2      /FLOATING POINT FORMAT
00276 R 442143 R            ISZ     X2
00277 R 442142 R            ISZ     X1
00300 R 442144 R            ISZ     X3
00301 R 442145 R            ISZ     X4
00302 R 442133 R            ISZ     COUNT
00303 R 600173 R            JMP     LOOP3
00304 R 122661 E            JMS*    TTRAN
00305 R 600307 R            JMP     .+2
00306 R 002174 R            .DSA    BREST
00307 R 620160 R            JMP*    FORMT
                    /
                    /
                    /
                    /
                    //...............INITIALIZATION ROUTINES........
                    /
                    /
                    /
                    /
00310 R 740000 A    POSIT   NOP
00311 R 760004 A            CLOF
00312 R 750004 A            LAS
```

```
00313 R 502713 R          AND     (100000
00314 R 741200 A          SNA
00315 R 600343 R          JMP     OTAX
00316 R 202714 R          LAC     (INAX1
00317 R 042140 R          DAC     INAX
00320 R 202715 R          LAC     (AX10
00321 R 042136 R          DAC     AX0
00322 R 777772 A          LAW     -6
00323 R 042133 R          DAC     COUNT
00324 R 402140 R   POS1   XCT     INAX     /COMPUTE RESOLVER BIASES
00325 R 740001 A          CMA
00326 R 342711 R          TAD     (1
00327 R 062136 R          DAC*    AX0
00330 R 442136 R          ISZ     AX0
00331 R 202140 R          LAC     INAX
00332 R 342675 R          TAD     (20
00333 R 042132 R          DAC     TMP
00334 R 502716 R          AND     (100
00335 R 740200 A          SZA
00336 R 100420 R          JMS     POS4
00337 R 202132 R          LAC     TMP
00340 R 042140 R          DAC     INAX
00341 R 442133 R          ISZ     COUNT
00342 R 600324 R          JMP     POS1
00343 R 750000 A   OTAX   CLA              /INITIALIZE RESOLVERS
00344 R 705004 A          OUTMOD
00345 R 202715 R          LAC     (AX10
00346 R 042136 R          DAC     AX0
00347 R 202717 R          LAC     (IC1
00350 R 042141 R          DAC     IC
00351 R 202720 R          LAC     (OUTAX1
00352 R 042137 R          DAC     OUTAX
00353 R 777772 A          LAW     -6       /INITIALIZE POSITION
00354 R 042133 R          DAC     COUNT    /FLAGS
00355 R 222136 R   POS2   LAC*    AX0
00356 R 740001 A          CMA
00357 R 362141 R          TAD*    IC
00360 R 402137 R          XCT     OUTAX
00361 R 442141 R          ISZ     IC
00362 R 442136 R          ISZ     AX0
00363 R 202137 R          LAC     OUTAX
00364 R 342675 R          TAD     (20
00365 R 042132 R          DAC     TMP
00366 R 502716 R          AND     (100
00367 R 740200 A          SZA
00370 R 100420 R          JMS     POS4
00371 R 202132 R          LAC     TMP
00372 R 042137 R          DAC     OUTAX
00373 R 442133 R          ISZ     COUNT
00374 R 600355 R          JMP     POS2
00375 R 705002 A          UPDTAX
00376 R 777772 A          LAW     -6
00377 R 042133 R          DAC     COUNT
00400 R 202710 R          LAC     (RFLG
00401 R 042142 R          DAC     X1
00402 R 202707 R          LAC     (TPO
00403 R 042143 R          DAC     X2
00404 R 162142 R   POS3   DZM*    X1
00405 R 162143 R          DZM*    X2
00406 R 442142 R          ISZ     X1
00407 R 442143 R          ISZ     X2
00410 R 442133 R          ISZ     COUNT
00411 R 600404 R          JMP     POS3
00412 R 770000 A          LAW     -10000
00413 R 042133 R          DAC     COUNT
00414 R 442133 R   WAIT   ISZ     COUNT
00415 R 600414 R          JMP     WAIT
00416 R 700044 A          CLON
00417 R 620310 R          JMP*    POSIT
00420 R 740000 A   POS4   NOP
00421 R 202132 R          LAC     TMP
00422 R 342716 R          TAD     (100
00423 R 042132 R          DAC     TMP
00424 R 620420 R          JMP*    POS4
```

```
                                /
                                /
                                /
                                /
        00425 R 740000 A       GETTSK  NOP
        00426 R 700004 A               CLOF
        00427 R 100435 R               JMS     STPRAT
        00430 R 202721 R               LAC     (STEP1
        00431 R 042227 R               DAC     STADR
        00432 R 100451 R               JMS     STCTRL
        00433 R 700044 A               CLON
        00434 R 620425 R               JMP*    GETTSK
                                /
                                /
                                /
                                /
        00435 R 740000 A       STPRAT  NOP
        00436 R 202722 R               LAC     (770000
        00437 R 705004 A               OUTMOD
        00440 R 750000 A               CLA
        00441 R 705024 A               OUTAX1
        00442 R 705044 A               OUTAX2
        00443 R 705064 A               OUTAX3
        00444 R 705204 A               OUTAX4
        00445 R 705224 A               OUTAX5
        00446 R 705244 A               OUTAX6
        00447 R 705002 A               UPDTAX
        00450 R 620435 R               JMP*    STPRAT
                                /
                                /
                                /
                                /
        00451 R 740000 A       STCTRL  NOP
        00452 R 202227 R               LAC     STADR
        00453 R 342670 R               TAD     (7
        00454 R 042240 R               DAC     SCCNT
        00455 R 222240 R               LAC*    SCCNT
        00456 R 042237 R               DAC     ST0       /ZERO LIMIT OPTION
        00457 R 740200 A               SZA
        00460 R 042230 R               DAC     LIMADR    /SET UP LIMADR
        00461 R 777772 A               LAW     -6
        00462 R 042240 R               DAC     SCCNT
        00463 R 202227 R               LAC     STADR     /SET UP OSPD
        00464 R 342711 R               TAD     (1
        00465 R 042146 R               DAC     X1I
        00466 R 202725 R               LAC     (OSPD
        00467 R 042147 R               DAC     X2I
        00470 R 222146 R       SC01    LAC*    X1I
        00471 R 442146 R               ISZ     X1I
        00472 R 062147 R               DAC*    X2I
        00473 R 442147 R               ISZ     X2I
        00474 R 442240 R               ISZ     SCCNT
        00475 R 600470 R               JMP     SC01
        00476 R 202657 E               LAC     COMM      /DEFINE RR CTRL PN'
        00477 R 342724 R               TAD     (154
        00500 R 042240 R               DAC     SCCNT
        00501 R 202227 R               LAC     STADR
        00502 R 342674 R               TAD     (10
        00503 R 042241 R               DAC     SCCNT1    /TRANSFER ONE F.P.
        00504 R 222241 R               LAC*    SCCNT1    /FROM CPTAB TO EXT
        00505 R 042241 R               DAC     SCCNT1
        00506 R 222241 R               LAC*    SCCNT1
        00507 R 062240 R               DAC*    SCCNT
        00510 R 442240 R               ISZ     SCCNT
        00511 R 442241 R               ISZ     SCCNT1
        00512 R 222241 R               LAC*    SCCNT1
        00513 R 062240 R               DAC*    SCCNT
        00514 R 222227 R               LAC*    STADR
        00515 R 502722 R               AND     (770000
        00516 R 740200 A               SZA
        00517 R 042325 R               DAC     FORMSK
        00520 R 222227 R               LAC*    STADR
        00521 R 640606 A               LLS     6
        00522 R 502722 R               AND     (770000
```

```
        00523 R 740200 A            SZA
        00524 R 042326 R            DAC     TOLMSK
                          ///SET UP FORCE MATRIX HERE
        00525 R 620451 R            JMP*    STCTRL
                          /
                          /
                          /
                          /
        00526 R 740000 A  ERROR     NOP
        00527 R 740040 A            HLT
                          /
                          /
                          /
                          /
                          //................CONTROL LOOP ROUTINES......
                          /
                          /
                          /
                          /
        00530 R 740000 A  READF     NOP
        00531 R 700002 A            IOF
        00532 R 202670 R            LAC     (7
        00533 R 701103 A            ADSM
        00534 R 701301 A            ADSF
        00535 R 600534 R            JMP     .-1
        00536 R 750000 A            CLA
        00537 R 701312 A            ADRB
        00540 R 042251 R            DAC     GAIN     /READ LOOP GAIN
        00541 R 202701 R            LAC     (F
        00542 R 040577 R            DAC     RF01
        00543 R 202725 R            LAC     (FB
        00544 R 042236 R            DAC     FBPNT
        00545 R 777770 A            LAW     -10
        00546 R 040600 R            DAC     RFCNT
        00547 R 202674 R            LAC     (10
        00550 R 040576 R            DAC     FCHAN
        00551 R 200576 R  RF02      LAC     FCHAN
        00552 R 440576 R            ISZ     FCHAN
        00553 R 701103 A            ADSM
        00554 R 701301 A            ADSF
        00555 R 600554 R            JMP     .-1
        00556 R 750004 A            LAS
        00557 R 502726 R            AND     (004000
        00560 R 740200 A            SZA
        00561 R 600601 R            JMP     FBIAS
        00562 R 750000 A            CLA
        00563 R 701312 A            ADRB
        00564 R 740000 A            NOP              /TMP REPLACES JMS ADDF
        00565 R 502323 R            AND     FCHOP
        00566 R 660502 A            LRSS    2        /SCALING
        00567 R 060577 R            DAC*    RF01
        00570 R 440577 R  RF03      ISZ     RF01
        00571 R 442236 R            ISZ     FBPNT
        00572 R 440600 R            ISZ     RFCNT
        00573 R 600551 R            JMP     RF02
        00574 R 700042 A            ION
        00575 R 620530 R            JMP*    READF
        00576 R 000000 A  FCHAN     0
        00577 R 000000 A  RF01      0
        00600 R 000000 A  RFCNT     0
        00601 R 750000 A  FBIAS     CLA
        00602 R 701312 A            ADRB
        00603 R 740001 A            CMA
        00604 R 342711 R            TAD     (1
        00605 R 062236 R            DAC*    FBPNT
        00606 R 160577 R            DZM*    RF01
        00607 R 600570 R            JMP     RF03
        00610 R 740000 A  ADDFB     NOP
        00611 R 362236 R            TAD*    FBPNT
        00612 R 620610 R            JMP*    ADDFB
                          /
                          /
                          /
```

```
                               /
00613 R 740000 A               FORMF    NOP
00614 R 202253 R                        LAC      F+1
00615 R 740001 A                        CMA
00616 R 342255 R                        TAD      F+3
00617 R 101143 R                        JMS      FORFIL
00620 R 042274 R                        DAC      FORCE+2 /FZ
00621 R 202256 R                        LAC      F+4
00622 R 740001 A                        CMA
00623 R 342254 R                        TAD      F+2
00624 R 101143 R                        JMS      FORFIL
00625 R 042272 R                        DAC      FORCE   /FX
00626 R 202256 R                        LAC      F+4
00627 R 342257 R                        TAD      F+5
00630 R 342260 R                        TAD      F+6
00631 R 342261 R                        TAD      F+7
00632 R 101143 R                        JMS      FORFIL
00633 R 042273 R                        DAC      FORCE+1 /FY
00634 R 202254 R                        LAC      F+2
00635 R 342252 R                        TAD      F
00636 R 740001 A                        CMA
00637 R 342253 R                        TAD      F+1
00640 R 342255 R                        TAD      F+3
00641 R 102014 R                        JMS      M304
00642 R 101143 R                        JMS      FORFIL
00643 R 042276 R                        DAC      FORCE+4 /MY
00644 R 202261 R                        LAC      F+7
00645 R 740001 A                        CMA
00646 R 342257 R                        TAD      F+5
00647 R 102014 R                        JMS      M304
00650 R 042246 R                        DAC      FFTMP
00651 R 202256 R                        LAC      F+4
00652 R 740001 A                        CMA
00653 R 342254 R                        TAD      F+2
00654 R 650000 A                        CLQ
00655 R 640601 A                        LLS      1
00656 R 342246 R                        TAD      FFTMP
00657 R 101143 R                        JMS      FORFIL
00660 R 042277 R                        DAC      FORCE+5 /MZ
00661 R 202252 R                        LAC      F
00662 R 740001 A                        CMA
00663 R 342260 R                        TAD      F+6
00664 R 102014 R                        JMS      M304
00665 R 042246 R                        DAC      FFTMP
00666 R 202255 R                        LAC      F+3
00667 R 740001 A                        CMA
00670 R 342253 R                        TAD      F+1
00671 R 650000 A                        CLQ
00672 R 640601 A                        LLS      1
00673 R 342246 R                        TAD      FFTMP
00674 R 101143 R                        JMS      FORFIL
00675 R 042275 R                        DAC      FORCE+3 /MX
                               /
00676 R 777772 A                        LAW      -6
00677 R 042134 R                        DAC      COUNTI
00700 R 202671 R                        LAC      (FORCE
00701 R 042147 R                        DAC      X2I
00702 R 202325 R                        LAC      FORMSK
00703 R 744000 A                        CLL
00704 R 740010 A               MLP      RAL
00705 R 740400 A                        SNL
00706 R 162147 R                        DZM*     X2I
00707 R 442147 R                        ISZ      X2I
00710 R 442134 R                        ISZ      COUNTI
00711 R 600704 R                        JMP      MLP
00712 R 620613 R                        JMP*     FORMF
                               /
                               /
                               /
                               /
00713 R 740000 A               STMON    NOP
00714 R 750004 A                        LAS
00715 R 502727 R                        AND      (001000 /CHECK PASSIVE MODE
```

```
00716 R 242330 R          XOR     PASFLG   /SWITCH
00717 R 741200 A          SNA
00720 R 600736 R          JMP     STM01
00721 R 750004 A          LAS
00722 R 502727 R          AND     (001000
00723 R 740200 A          SZA
00724 R 600732 R          JMP     STM02
00725 R 142330 R          DZM     PASFLG
00726 R 202327 R          LAC     START
00727 R 042227 R          DAC     STADR
00730 R 100451 R          JMS     STCTRL
00731 R 600736 R          JMP     STM01
00732 R 042330 R  STM02   DAC     PASFLG
00733 R 202730 R          LAC     (STEPPA
00734 R 042227 R          DAC     STADR
00735 R 100451 R          JMS     STCTRL
00736 R 202227 R  STM01   LAC     STADR
00737 R 342731 R          TAD     (11
00740 R 042242 R          DAC     SMPNT    /ADR 1ST TERMCND EN
00741 R 222242 R  SM06    LAC*    SMPNT
00742 R 740200 A          SZA
00743 R 601007 R          JMP     SM01     /ANGLE TERMCOND
00744 R 442242 R          ISZ     SMPNT
00745 R 222242 R          LAC*    SMPNT
00746 R 042245 R          DAC     NSADR    /NEXT STEP ADDRESS
00747 R 777772 A          LAW     -6
00750 R 042243 R          DAC     SMCNT
00751 R 202671 R          LAC     (FORCE
00752 R 042244 R          DAC     SMPNT1
00753 R 442242 R  SM03    ISZ     SMPNT
00754 R 222244 R          LAC*    SMPNT1   /CHECK FOR FCRIT
00755 R 740100 A          SMA
00756 R 740001 A          CMA
00757 R 342711 R          TAD     (1
00760 R 342322 R          TAD     FCRIT
00761 R 741100 A          SPA
00762 R 740000 A          NOP              /TEMP FCRIT ROUTINE
00763 R 222242 R          LAC*    SMPNT
00764 R 741200 A          SNA
00765 R 600777 R          JMP     SM05     /LIMIT ZERO-SKP TO NEXT
00766 R 740100 A          SMA
00767 R 600774 R          JMP     SM02     /LIMIT IS NEGATIVE
00770 R 362244 R          TAD*    SMPNT1
00771 R 740100 A          SMA
00772 R 601010 R          JMP     SM04     /POS LIMIT EXCEEDED
00773 R 600777 R          JMP     SM05     /GO TO NEXT LINE
00774 R 362244 R  SM02    TAD*    SMPNT1
00775 R 741100 A          SPA
00776 R 601010 R          JMP     SM04     /NEG LIMIT EXCEEDED
00777 R 442244 R  SM05    ISZ     SMPNT1
01000 R 442243 R          ISZ     SMCNT
01001 R 600753 R          JMP     SM03
01002 R 442242 R          ISZ     SMPNT
01003 R 222242 R          LAC*    SMPNT
01004 R 542732 R          SAD     (EOS     /ANOTHER COND TO CHECK?
01005 R 620713 R          JMP*    STMON
01006 R 600741 R          JMP     SM06
01007 R 740040 A  SM01    HLT              /HLT ON ANGLE TERMCOND
01010 R 202245 R  SM04    LAC     NSADR
01011 R 042227 R          DAC     STADR
01012 R 100451 R          JMS     STCTRL
01013 R 620713 R          JMP*    STMON
                  /
                  /
                  /
                  /
                  /
                  /
                  /
                  /
01143 R 740000 A  FORFIL  NOP              /FILTER NOISE IN FORCE
01144 R 744000 A          CLL              /DATA
01145 R 741100 A          SPA
```

```
01146 R 744002 A                STL
01147 R 741100 A                SPA
01150 R 740001 A                CMA
01151 R 502324 R                AND     FORCHP
01152 R 740400 A                SNL
01153 R 621143 R                JMP*    FORFIL
01154 R 740001 A                CMA
01155 R 342711 R                TAD     (1
01156 R 621143 R                JMP*    FORFIL
                       /
                       /
                       /
                       /
01157 R 740000 A       ATXSPU   NOP
01160 R 202657 E                LAC     COMM
01161 R 342736 R                TAD     (44
01162 R 042216 R                DAC     AT
01163 R 202657 E                LAC     COMM
01164 R 342733 R                TAD     (14
01165 R 042217 R                DAC     SPD
01166 R 202657 E                LAC     COMM
01167 R 342676 R                TAD     (30
01170 R 042220 R                DAC     TD
01171 R 202737 R                LAC     (STRN
01172 R 042222 R                DAC     NPNT
01173 R 202217 R                LAC     SPD
01174 R 342740 R                TAD     (-2
01175 R 042221 R                DAC     SPDPNT
01176 R 101254 R                JMS     RN          /SCALE TRANS COMMANDS
01177 R 101254 R                JMS     RN
01200 R 101254 R                JMS     RN
01201 R 202741 R                LAC     (SROT
01202 R 042222 R                DAC     NPNT
01203 R 101254 R                JMS     RN          /SCALE ROT COMMANDS
01204 R 101254 R                JMS     RN
01205 R 101254 R                JMS     RN
01206 R 777772 A                LAW     -6
01207 R 041216 R                DAC     M
01210 R 142214 R       OLOOP    DZM     TEMP        /MULTIPLY COMMAND VECTOR
01211 R 142215 R                DZM     TEMP+1      /BY MATRIX
01212 R 777772 A                LAW     -6
01213 R 041215 R                DAC     N
01214 R 101565 R       ILOOP    JMS     SSM6X6
01215 R 000000 A       N        0
01216 R 000000 A       M        0
01217 R 342216 R                TAD     AT
01220 R 101540 R                JMS     FAL
01221 R 201215 R                LAC     N
01222 R 101605 R                JMS     SSV6
01223 R 342217 R                TAD     SPD
01224 R 101444 R                JMS     MULT
01225 R 202200 R                LAC     FA1
01226 R 042203 R                DAC     HA1
01227 R 202201 R                LAC     FA2
01230 R 042204 R                DAC     HA2
01231 R 202742 R                LAC     (TEMP
01232 R 101540 R                JMS     FAL
01233 R 101266 R                JMS     ADD
01234 R 202742 R                LAC     (TEMP
01235 R 101554 R                JMS     FAS
01236 R 441215 R                ISZ     N
01237 R 601214 R                JMP     ILOOP
01240 R 201216 R                LAC     M
01241 R 101605 R                JMS     SSV6
01242 R 342220 R                TAD     TD
01243 R 042205 R                DAC     ADR
01244 R 202214 R                LAC     TEMP
01245 R 062205 R                DAC*    ADR
01246 R 442205 R                ISZ     ADR
01247 R 202215 R                LAC     TEMP+1
01250 R 062205 R                DAC*    ADR
01251 R 441216 R                ISZ     M
01252 R 601210 R                JMP     OLOOP
```

```
01253 R 621157 R             JMP*    ATXSPD
                       /
                       /
01254 R 740000 A       RN    NOP
01255 R 202221 R             LAC     SPOPNT
01256 R 342743 R             TAD     (2
01257 R 042221 R             DAC     SPOPNT
01260 R 101540 R             JMS     FAL
01261 R 202222 R             LAC     NPNT
01262 R 101444 R             JMS     MULT
01263 R 202221 R             LAC     SPOPNT
01264 R 101554 R             JMS     FAS
01265 R 621254 R             JMP*    RN
                       /
                       /
01266 R 740000 A       ADD   NOP                /FLOATING POINT ADD
01267 R 101425 R             JMS     SIG        /ROUTINE
01270 R 202204 R             LAC     HA2
01271 R 741200 A             SNA
01272 R 601377 R             JMP     ADD1
01273 R 202201 R             LAC     FA2
01274 R 741200 A             SNA
01275 R 601357 R             JMP     ADD8
01276 R 202200 R       ADD7  LAC     FA1
01277 R 740001 A             CMA
01300 R 342203 R             TAD     HA1
01301 R 740100 A             SMA
01302 R 601352 R             JMP     ADD5
01303 R 042207 R             DAC     DELTA
01304 R 342744 R             TAD     (32
01305 R 751100 A             SPA!CLA
01306 R 601345 R             JMP     ADD10
01307 R 202207 R             LAC     DELTA
01310 R 740001 A             CMA
01311 R 342711 R             TAD     (1
01312 R 242745 R             XOR     (640500
01313 R 041317 R             DAC     ADDP
01314 R 650000 A             CLQ
01315 R 202204 R             LAC     HA2
01316 R 744000 A             CLL
01317 R 740040 A       ADDP  XX
01320 R 042204 R             DAC     HA2
01321 R 202211 R             LAC     SIGN
01322 R 740100 A             SMA
01323 R 601330 R             JMP     ADD2
01324 R 202204 R             LAC     HA2
01325 R 740001 A             CMA
01326 R 342711 R             TAD     (1
01327 R 042204 R             DAC     HA2
01330 R 202201 R       ADD2  LAC     FA2
01331 R 744020 A             RCR
01332 R 342204 R             TAD     HA2
01333 R 042201 R             DAC     FA2
01334 R 740100 A             SMA
01335 R 601343 R             JMP     ADD3
01336 R 202201 R             LAC     FA2
01337 R 740001 A             CMA
01340 R 342711 R             TAD     (1
01341 R 042201 R             DAC     FA2
01342 R 202662 R             LAC     (400000
01343 R 442200 R       ADD3  ISZ     FA1
01344 R 740000 A             NOP
01345 R 242210 R       ADD10 XOR     SIGS
01346 R 502662 R             AND     (400000
01347 R 042211 R             DAC     SIGN
01350 R 101403 R             JMS     NOR
01351 R 601377 R             JMP     ADD1
01352 R 101361 R       ADD5  JMS     ADD6
01353 R 202211 R             LAC     SIGN
01354 R 242210 R             XOR     SIGS
01355 R 042210 R             DAC     SIGS
01356 R 601276 R             JMP     ADD7
01357 R 101361 R       ADD8  JMS     ADD6
```

```
01360 R 601377 R           JMP     ADD1
01361 R 740000 A   ADD6    NOP
01362 R 202201 R           LAC     FA2
01363 R 042206 R           DAC     TMPA
01364 R 202204 R           LAC     HA2
01365 R 042201 R           DAC     FA2
01366 R 202206 R           LAC     TMPA
01367 R 042204 R           DAC     HA2
01370 R 202200 R           LAC     FA1
01371 R 042206 R           DAC     TMPA
01372 R 202203 R           LAC     HA1
01373 R 042200 R           DAC     FA1
01374 R 202206 R           LAC     TMPA
01375 R 042203 R           DAC     HA1
01376 R 621361 R           JMP*    ADD6
01377 R 202201 R   ADD1    LAC     FA2
01400 R 242211 R           XOR     SIGN
01401 R 042201 R           DAC     FA2
01402 R 621266 R           JMP*    ADD
01403 R 740000 A   NOR     NOP                 /NORMALIZE ROUTINE
01404 R 202201 R           LAC     FA2
01405 R 744200 A           SZA!CLL
01406 R 601412 R           JMP     NOR1
01407 R 142200 R           DZM     FA1
01410 R 142211 R           DZM     SIGN
01411 R 621403 R           JMP*    NOR
01412 R 650000 A   NOR1    CLQ
01413 R 202201 R           LAC     FA2
01414 R 744000 A           CLL
01415 R 640444 A           NORM
01416 R 042201 R           DAC     FA2
01417 R 641001 A           LACS
01420 R 342712 R           TAD     (-35
01421 R 740001 A           CMA
01422 R 342200 R           TAD     FA1
01423 R 042200 R           DAC     FA1
01424 R 621403 R           JMP*    NOR
01425 R 740000 A   SIG     NOP
01426 R 202201 R           LAC     FA2
01427 R 502662 R           AND     (400000
01430 R 042210 R           DAC     SIGS
01431 R 202201 R           LAC     FA2
01432 R 502746 R           AND     (377777
01433 R 042201 R           DAC     FA2
01434 R 202204 R           LAC     HA2
01435 R 242210 R           XOR     SIGS
01436 R 502662 R           AND     (400000
01437 R 042211 R           DAC     SIGN
01440 R 202204 R           LAC     HA2
01441 R 502746 R           AND     (377777
01442 R 042204 R           DAC     HA2
01443 R 621425 R           JMP*    SIG
                   /
                   /
01444 R 740000 A   MULT    NOP                 /FLOATING POINT MULTIPLY
01445 R 042212 R           DAC     ARG         /ROUTINE
01446 R 741100 A           SPA
01447 R 222212 R           LAC*    ARG
01450 R 042212 R           DAC     ARG
01451 R 202200 R           LAC     FA1
01452 R 042203 R           DAC     HA1
01453 R 202201 R           LAC     FA2
01454 R 741200 A           SNA
01455 R 601524 R           JMP     MULT2
01456 R 042204 R           DAC     HA2
01457 R 222212 R           LAC*    ARG
01460 R 502747 R           AND     (777
01461 R 242750 R           XOR     (400
01462 R 342751 R           TAD     (777400
01463 R 042200 R           DAC     FA1
01464 R 442212 R           ISZ     ARG
01465 R 222212 R           LAC*    ARG
01466 R 741200 A           SNA
```

```
01467 R 601524 R                 JMP     MULT2
01470 R 042201 R                 DAC     FA2
01471 R 142202 R                 DZM     FA3
01472 R 202200 R                 LAC     FA1
01473 R 342203 R                 TAD     MA1
01474 R 042200 R                 DAC     FA1
01475 R 142211 R                 DZM     SIGN
01476 R 202204 R                 LAC     MA2
01477 R 741100 A                 SPA
01500 R 101530 R                 JMS     MULT4
01501 R 640701 A                 ALS     1
01502 R 041511 R                 DAC     MULT1
01503 R 202201 R                 LAC     FA2
01504 R 741100 A                 SPA
01505 R 101530 R                 JMS     MULT4
01506 R 640701 A                 ALS     1
01507 R 744000 A                 CLL
01510 R 653122 A                 MUL
01511 R 740000 A        MULT1    NOP
01512 R 640501 A                 LRS     1
01513 R 042201 R                 DAC     FA2
01514 R 101403 R                 JMS     NOR
01515 R 202201 R                 LAC     FA2
01516 R 242211 R                 XOR     SIGN
01517 R 042201 R                 DAC     FA2
01520 R 641002 A                 LACQ
01521 R 502752 R                 AND     (777000
01522 R 042202 R                 DAC     FA3
01523 R 621444 R                 JMP*    MULT
01524 R 142200 R        MULT2    DZM     FA1
01525 R 142201 R                 DZM     FA2
01526 R 142202 R                 DZM     FA3
01527 R 621444 R                 JMP*    MULT
01530 R 740000 A        MULT4    NOP
01531 R 502746 R                 AND     (377777
01532 R 042213 R                 DAC     M3
01533 R 202211 R                 LAC     SIGN
01534 R 242662 R                 XOR     (400000
01535 R 042211 R                 DAC     SIGN
01536 R 202213 R                 LAC     M3
01537 R 621530 R                 JMP*    MULT4
                        /
                        /
01540 R 740000 A        FAL      NOP             /FLOATING ACC LOAD
01541 R 042205 R                 DAC     ADR
01542 R 222205 R                 LAC*    ADR
01543 R 502747 R                 AND     (777
01544 R 242750 R                 XOR     (400
01545 R 342751 R                 TAD     (777400
01546 R 042200 R                 DAC     FA1
01547 R 442205 R                 ISZ     ADR
01550 R 222205 R                 LAC*    ADR
01551 R 042201 R                 DAC     FA2
01552 R 142202 R                 DZM     FA3
01553 R 621540 R                 JMP*    FAL
01554 R 740000 A        FAS      NOP             /FLOATING ACC STORE
01555 R 042205 R                 DAC     ADR
01556 R 202200 R                 LAC     FA1
01557 R 502747 R                 AND     (777
01560 R 062205 R                 DAC*    ADR
01561 R 442205 R                 ISZ     ADR
01562 R 202201 R                 LAC     FA2
01563 R 062205 R                 DAC*    ADR
01564 R 621554 R                 JMP*    FAS
01565 R 740000 A        SSM6X6   NOP             /SUBSCRIPT ROUTINE
01566 R 202670 R                 LAC     (7      /6 X 6 MATRIX
01567 R 361565 R                 TAD*    SSM6X6
01570 R 441565 R                 ISZ     SSM6X6
01571 R 342753 R                 TAD     (-1
01572 R 744000 A                 CLL
01573 R 653122 A                 MUL
01574 R 000006 A                 6
01575 R 641002 A                 LACQ
```

```
01576 R 342670 R           TAD     (7
01577 R 361565 R           TAD*    SSM6X6
01600 R 441565 R           ISZ     SSM6X6
01601 R 342753 R           TAD     (-1
01602 R 744000 A           CLL
01603 R 640701 A           ALS     1
01604 R 621565 R           JMP*    SSM6X6
01605 R 740000 A   SSV6    NOP             /SUBSCRIPT ROUTINE
01606 R 342754 R           TAD     (6      /6 COMP VECTOR
01607 R 744000 A           CLL
01610 R 640701 A           ALS     1
01611 R 621605 R           JMP*    SSV6
                   /
                   /
                   /
                   /
01612 R 000000 A   FORMTD  0               /FORMAT F.P. WORI
01613 R 202657 E           LAC     COMM    /FIXED POINT RATE
01614 R 342154 R           TAD     COMM30  /COMMAND
01615 R 042146 R           DAC     X1I
01616 R 202755 R           LAC     (TOL
01617 R 042147 R           DAC     X2I
01620 R 777772 A           LAW     -6
01621 R 042134 R           DAC     COUNTI
01622 R 222146 R   LOOPA   LAC*    X1I     /EXP PORTION
01623 R 442146 R           ISZ     X1I
01624 R 502747 R           AND     (777
01625 R 242750 R           XOR     (400
01626 R 342751 R           TAD     (777400
01627 R 740100 A           SMA
01630 R 601637 R           JMP     SHFTL
01631 R 740001 A           CMA
01632 R 342711 R           TAD     (1
01633 R 502665 R           AND     (77
01634 R 242756 R           XOR     (LRSS
01635 R 042135 R           DAC     OPRI
01636 R 601642 R           JMP     DATA
01637 R 502665 R   SHFTL   AND     (77
01640 R 242757 R           XOR     (LLSS
01641 R 042135 R           DAC     OPRI
01642 R 222146 R   DATA    LAC*    X1I     /MAGNITUDE PORTI
01643 R 442146 R           ISZ     X1I
01644 R 740100 A           SMA
01645 R 601651 R           JMP     SHIFT
01646 R 502746 R           AND     (377777
01647 R 740001 A           CMA
01650 R 342711 R           TAD     (1
01651 R 744000 A   SHIFT   CLL
01652 R 650000 A           CLQ
01653 R 660503 A           LRSS    3       /SHIFT FOR RATE
01654 R 402135 R           XCT     OPRI
01655 R 062147 R           DAC*    X2I
01656 R 750004 A           LAS
01657 R 502760 R           AND     (700    /SCALING SWITCHI
01660 R 744000 A           CLL
01661 R 640506 A           LRS     6
01662 R 242757 R           XOR     (LLSS
01663 R 042135 R           DAC     OPRI
01664 R 222147 R           LAC*    X2I
01665 R 650000 A           CLQ
01666 R 402135 R           XCT     OPRI
01667 R 062147 R           DAC*    X2I
01670 R 601706 R           JMP     INC
01671 R 202113 R   ACCEL   LAC     ADP+7   /THIS OPT TEMP
01672 R 741100 A           SPA
01673 R 740001 A           CMA
01674 R 502735 R           AND     (776000
01675 R 744000 A           CLL
01676 R 640513 A           LRS     13
01677 R 342711 R           TAD     (1
01700 R 041703 R           DAC     .+3
01701 R 222147 R           LAC*    X2I
01702 R 657122 A           MULS
```

```
01703 R 740040 A              XX
01704 R 641002 A              LACQ
01705 R 062147 R              DAC*     X2I
01706 R 442147 R      INC     ISZ      X2I
01707 R 442134 R              ISZ      COUNTI
01710 R 601622 R              JMP      LOOPA
                      /--------------------
01711 R 777772 A              LAW      -6
01712 R 042134 R              DAC      COUNTI
01713 R 744000 A              CLL
01714 R 202755 R              LAC      (TOL
01715 R 042147 R              DAC      X2I
01716 R 202326 R              LAC      TOLMSK   /MASK OUT UNDESIRE
01717 R 740010 A      MLP1    RAL               /RATES
01720 R 740400 A              SNL
01721 R 162147 R              DZM*     X2I
01722 R 442147 R              ISZ      X2I
01723 R 442134 R              ISZ      COUNTI
01724 R 601717 R              JMP      MLP1
                      /LOGICAL TO PHYSICAL TRANSFORMATION
01725 R 202076 R              LAC      TOL+1
01726 R 102006 R              JMS      MUL6
01727 R 042066 R              DAC      TOP
01730 R 202077 R              LAC      TOL+2
01731 R 342075 R              TAD      TOL
01732 R 740001 A              CMA
01733 R 342711 R              TAD      (1
01734 R 102006 R              JMS      MUL6
01735 R 042067 R              DAC      TOP+1
01736 R 202075 R              LAC      TOL
01737 R 102006 R              JMS      MUL6
01740 R 744000 A              CLL
01741 R 660501 A              LRSS     1
01742 R 042070 R              DAC      TOP+2
01743 R 202101 R              LAC      TOL+4
01744 R 342102 R              TAD      TOL+5
01745 R 740001 A              CMA
01746 R 342711 R              TAD      (1
01747 R 102023 R              JMS      M203
01750 R 042071 R              DAC      TOP+3
01751 R 202101 R              LAC      TOL+4
01752 R 740001 A              CMA
01753 R 342711 R              TAD      (1
01754 R 342102 R              TAD      TOL+5
01755 R 102023 R              JMS      M203
01756 R 042072 R              DAC      TOP+4
01757 R 202100 R              LAC      TOL+3
01760 R 102033 R              JMS      M809
01761 R 042073 R              DAC      TOP+5
                      /--------------------
01762 R 621612 R              JMP*     FORMTO
                      /
                      /
                      /
                      /
01763 R 740000 A      OUTTD   NOP               /OUTPUT RATES TO D
01764 R 202722 R              LAC      (770000
01765 R 705004 A              OUTMOD
01766 R 202066 R              LAC      TOP
01767 R 705024 A              OUTAX1
01770 R 202067 R              LAC      TOP+1
01771 R 705044 A              OUTAX2
01772 R 202070 R              LAC      TOP+2
01773 R 705064 A              OUTAX3
01774 R 202071 R              LAC      TOP+3
01775 R 705204 A              OUTAX4
01776 R 202072 R              LAC      TOP+4
01777 R 705224 A              OUTAX5
02000 R 202073 R              LAC      TOP+5
02001 R 705244 A              OUTAX6
02002 R 202074 R              LAC      TOP+6
02003 R 705264 A              OUTAX7
02004 R 705002 A              UPDTAX
```

```
02005 R 621763 R            JMP*    OUTTD
                      /
                      /
                      /
                      /
02006 R 740000 A      MUL6  NOP                /MULT BY 6
02007 R 744000 A            CLL
02010 R 657122 A            MULS
02011 R 000006 A            6
02012 R 641002 A            LACQ
02013 R 622006 R            JMP*    MUL6
02014 R 740000 A      M304  NOP                /MULT BY 3/4
02015 R 660502 A            LRSS    2
02016 R 744000 A            CLL
02017 R 657122 A            MULS
02020 R 000003 A            3
02021 R 641002 A            LACQ
02022 R 622014 R            JMP*    M304
02023 R 740000 A      M203  NOP                /MULT BY 2/3
02024 R 744000 A            CLL
02025 R 640601 A            LLS     1
02026 R 744000 A            CLL
02027 R 657323 A            IDIVS
02030 R 000003 A            3
02031 R 641002 A            LACQ
02032 R 622023 R            JMP*    M203
02033 R 740000 A      M809  NOP                /MULT BY 8/9
02034 R 744000 A            CLL
02035 R 640603 A            LLS     3
02036 R 744000 A            CLL
02037 R 657323 A            IDIVS
02040 R 000011 A            11
02041 R 641002 A            LACQ
02042 R 622033 R            JMP*    M809
                      /
                      /
                      /
                      /
                      /STORAGE ALLOCATIONS
                      /
                      /
02043 R        A      TP     .BLOCK  7
02052 R        A      TPO    .BLOCK  6
02060 R        A      RFLG   .BLOCK  6
02066 R        A      TOP    .BLOCK  7
02075 R        A      TDL    .BLOCK  7
02104 R        A      ADP    .BLOCK  10
02114 R 000000 A      AX1B   0
02115 R 000000 A      AX2B   0
02116 R 000000 A      AX3B   0
02117 R 000000 A      AX4B   0
02120 R 000000 A      AX5B   0
02121 R 000000 A      AX6B   0
02122 R 000000 A      AX7B   0
02123 R 733000 A      IC1    733000
02124 R 024400 A      IC2    024400
02125 R 162000 A      IC3    162000
02126 R 204000 A      IC4    204000
02127 R 641000 A      IC5    641000
02130 R 207000 A      IC6    207000
02131 R 000100 A      IC7    000100
02132 R 000000 A      TMP    0
02133 R 000000 A      COUNT  0
02134 R 000000 A      COUNTI 0
02135 R 000000 A      OPRI   0
02136 R 000000 A      AXB    0
02137 R 000000 A      OUTAX  0
02140 R 000000 A      INAX   0
02141 R 000000 A      IC     0
02142 R 000000 A      X1     0
02143 R 000000 A      X2     0
02144 R 000000 A      X3     0
02145 R 000000 A      X4     0
```

```
02146 R 000000 A     X1I      0
02147 R 000000 A     X2I      0
02150 R 400000 A     B0       400000
02151 R 200000 A     B1       200000
02152 R 000000 A     NONB0    0
02153 R 000000 A     TMPT     0
02154 R 000030 A     COMM30   30
02155 R        A     REST     .BLOCK   14
02171 R 020014 A              .DSA     020014
02172 R 000000 A              .DSA     0
02173 R 000000 A              .DSA     0
02174 R 002155 R     BREST    .DSA     REST
02175 R 000000 A     ACSAVE   0
02176 R 000000 A     MQSAVE   0
02177 R 000000 A     SCSAVE   0
                     /
02200 R 000000 A     FA1      0
02201 R 000000 A     FA2      0
02202 R 000000 A     FA3      0
02203 R 000000 A     HA1      0
02204 R 000000 A     HA2      0
02205 R 000000 A     ADR      0
02206 R 000000 A     TMPA     0
02207 R 000000 A     DELTA    0
02210 R 000000 A     SIGS     0
02211 R 000000 A     SIGN     0
02212 R 000000 A     ARG      0
02213 R 000000 A     M3       0
02214 R 000000 A     TEMP     0
02215 R 000000 A              0
02216 R 000000 A     AT       0
02217 R 000000 A     SPD      0
02220 R 000000 A     TD       0
02221 R 000000 A     SPDPNT   0
02222 R 000000 A     NPNT     0
02223 R 000775 A     SHOT     000775
02224 R 200000 A              200000
02225 R 000000 A     STRN     000000
02226 R 244000 A              244000
                     /
                     /
02227 R 000000 A     STADR    0
02230 R 000000 A     LIMADR   0
02231 R 000000 A     STCT     0
02232 R 000000 A     FPNT     0
02233 R 000000 A     LPNT     0
02234 R 000000 A     IPNT     0
02235 R 000000 A     OPNT     0
02236 R 000000 A     FBPNT    0
02237 R 000000 A     ST0      0
02240 R 000000 A     SCCNT    0
02241 R 000000 A     SCCNT1   0
02242 R 000000 A     SMPNT    0
02243 R 000000 A     SMCNT    0
02244 R 000000 A     SMPNT1   0
02245 R 000000 A     NSADR    0
02246 R 000000 A     FFTMP    0
02247 R 000000 A     CTMP     0
02250 R 000000 A     SHIT     0
02251 R 000000 A     GAIN     0
02252 R        A     F        .BLOCK   10
02262 R        A     FB       .BLOCK   10
02272 R        A     FORCE    .BLOCK   6
02300 R        A     MODE     .BLOCK   6
02306 R        A     ISPD     .BLOCK   6
02314 R        A     OSPD     .BLOCK   6
02322 R 377777 A     FCRIT    377777
02323 R 777777 A     FCHOP    777777
02324 R 740000 A     FORCHP   740000
02325 R 770000 A     FORMSK   770000
02326 R 770000 A     TOLMSK   770000
02327 R 002331 R     START    STEP1
02330 R 000000 A     PASFLG   0
```

```
                                     /
                                     /
                                     /
                      002331 R       STAB=STEP1
        02331 R 000001 A      STEP1       1                   /STEP NUMBER
        02332 R 000000 A                  0                   /OSPD
        02333 R 000000 A                  0
        02334 R 000000 A                  0
        02335 R 000000 A                  0
        02336 R 000000 A                  0
        02337 R 000000 A                  0
        02340 R 000000 A                  0                   /LIMTAB PTR
        02341 R 002645 R                  .DSA     CP1        /CPTAB PNTR
        02342 R 000000 A                  0                   /TERMCOND CODE
        02343 R 002331 R                  STEP1
        02344 R 000000 A                  0                   /TERMCONDS
        02345 R 000000 A                  0
        02346 R 000000 A                  0
        02347 R 000000 A                  0
        02350 R 000000 A                  0
        02351 R 000000 A                  0
        02352 R 757575 A                  EOS
        02353 R        A      STEP2       .BLOCK   22
        02375 R        A      STEP3       .BLOCK   22
        02417 R        A      STEP4       .BLOCK   22
        02441 R        A      STEP5       .BLOCK   22
        02463 R        A      STEP6       .BLOCK   22
        02505 R        A      STEP7       .BLOCK   22
        02527 R 777700 A      STEPPA      777700
        02530 R        A                  .BLOCK   6
        02536 R 000000 A                  0
        02537 R 002645 R                  CP1
        02540 R 000000 A                  0
        02541 R 002527 R                  STEPPA
        02542 R        A                  .BLOCK   6
        02550 R 757575 A                  757575

                      002645 R       CPTAB=CP1
        02645 R 000003 A      CP1         3
        02646 R 351000 A                  351000
        02647 R 000000 A      CP2         0
        02650 R 000000 A                  0
        02651 R 000000 A      CP3         0
        02652 R 000000 A                  0
        02653 R 000000 A      CP4         0
        02654 R 000000 A                  0
        02655 R 000000 A      CP5         0
        02656 R 000000 A                  0
                000000 A                  .END
        02657 R 002657 E *E
        02660 R 002660 E *E
        02661 R 002661 E *E
        02662 R 400000 A *L
        02663 R 002000 A *L
        02664 R 200000 A *L
        02665 R 000077 A *L
        02666 R 640402 A *L
        02667 R 640477 A *L
        02670 R 000007 A *L
        02671 R 002272 R *L
        02672 R 000070 A *L
        02673 R 000000 A *L
        02674 R 000010 A *L
        02675 R 000020 A *L
        02676 R 000030 A *L
        02677 R 000040 A *L
        02700 R 002042 R *L
        02701 R 002252 R *L
```

```
02702 R 002271 R *L
02703 R 002074 R *L
02704 R 002065 R *L
02705 R 002045 R *L
02706 R 002155 R *L
02707 R 002052 R *L
02710 R 002060 R *L
02711 R 000001 A *L
02712 R 777743 A *L
02713 R 100000 A *L
02714 R 705032 A *L
02715 R 002114 R *L
02716 R 000100 A *L
02717 R 002123 R *L
02720 R 705024 A *L
02721 R 002331 R *L
02722 R 770000 A *L
02723 R 002314 R *L
02724 R 000154 A *L
02725 R 002262 R *L
02726 R 004000 A *L
02727 R 001000 A *L
02730 R 002527 R *L
02731 R 000011 A *L
02732 R 757575 A *L
02733 R 000014 A *L
02734 R 002306 R *L
02735 R 776000 A *L
02736 R 000044 A *L
02737 R 002225 R *L
02740 R 777776 A *L
02741 R 002223 R *L
02742 R 002214 R *L
02743 R 000002 A *L
02744 R 000032 A *L
02745 R 640500 A *L
02746 R 377777 A *L
02747 R 000777 A *L
02750 R 000400 A *L
02751 R 777400 A *L
02752 R 777000 A *L
02753 R 777777 A *L
02754 R 000006 A *L
02755 R 002075 R *L
02756 R 660500 A *L
02757 R 660600 A *L
02760 R 000700 A *L
    SIZE=02773     NO ERROR LINES
C                   TTRAN
C  HARDWARE-TO-SOFTWARE ANGLE TRANSFORMATION MATRIX
C  CALLED WITH HARDWARE ANGLES IN PARAMETER R(6)
C  PUTS COMPUTED SOFTWARE ANGLES IN COMMON VARIABLE T(6)
C  ACC SWITCH 3 UP PRINTS OUT SOFTWARE ANGLES IN DEGREES
C
C
      SUBROUTINE TTRAN(R)
      DIMENSION R(6),G(6)
      COMMON/COMM/T(6),A(12),B(6,6),EXT
      T(1)=(R(3)/3.)*6.28318
      T(2)=(R(1)/6.)*6.28318
      T(3)=(-R(2)/6.-R(3)/3.)*6.28318
      T(4)=(R(6)*1.2)*6.28318
      T(5)=(-(R(4)+R(5))*.75-.125)*6.28318
      T(6)=((R(5)-R(4))*.75)*6.28318
      L=IACSW(3)
      IF (L.EQ.0) GO TO 300
      DO 301 LL=1,6
      G(LL)=T(LL)*57.29579
301   CONTINUE
      WRITE(3,100) G
100   FORMAT(6F12.6///////////)
300   CONTINUE
      RETURN
      END
```

```
C                       FAMAT
C SUBROUTINE TO COMPUTE THE JACOBIAN MATRIX FOR THE E-2 ARM
C CALLS MINV10 TO INVERT THE MATRIX
C IF ARM AND HAND ARE WITHIN 5 DEG OF ALINGMENT THE MATRIX IS
C       COMPRESSED TO A 4 X 4 MATRIX BEFORE INVERSION
C  ACC SWITCH 4 UP PRINTS OUT JACOBIAN
C  ACC SWITCH 5 UP PRINTS OUT INVERTED MATRIX
C
C
      SUBROUTINE FAMAT
      DIMENSION AJ(6,6),AJS(4,4)
      COMMON/COMM/T(6),SPD(6),TD(6),AT(6,6),EXT
      IF=0
      S2=SIN(T(2))
      S3=SIN(T(3))
      S4=SIN(T(4))
      S5=SIN(T(5))
      S6=SIN(T(6))
      C2=COS(T(2))
      C3=COS(T(3))
      C4=COS(T(4))
      C5=COS(T(5))
      C6=COS(T(6))
      DO 11 I=1,6
11    AJ(I,6)=0.
      AJ(2,5)=0.
      AJ(5,5)=0.
      AJ(2,4)=0.
      AJ(5,6)=1.0
      AJ(1,5)=-EXT*S6
      AJ(3,5)=EXT*C6
      AJ(4,5)=C6
      AJ(6,5)=S6
      C56=C5*C6
      S6C5=S6*C5
      AJ(1,4)=-1.39*C6-EXT*C56
      AJ(3,4)=-1.39*S6-EXT*S6C5
      AJ(4,4)=-S6C5
      AJ(5,4)=S5
      AJ(6,4)=C56
      C46=C4*C6
      S4C6=S4*C6
      S456=S4*S5*S6
      AJ(1,3)=40.*(S4C6+S5*S6*C4)-1.39*S6C5*C4-EXT*(S4C6*S5+S6*C4)
      AJ(2,3)=1.39*S5*C4+40.*C4*C5
      AJ(3,3)=40.*(S4*S6-S5*C46)+1.39*C4*C56+EXT*(C46-S456)
      AJ(4,3)=-S456+C46
      AJ(5,3)=-S4*C5
      AJ(6,3)=S4C6*S5+S6*C4
      P6=S3*C6
      P7=S3*S5
      P8=S3*S6
      P9=S4C6
      P10=S4*S6
      P11=C6*S5
      P12=C56
      P14=S5*S6
      P18=S6*C5
      P19=C4*C3
      P24=C3*18.
      P25=C5*18.
      P27=18.*P19
      R12=-P18*40.-P25*P8-P24*P9-P14*(P27+1.39)
      R22=P7*18.-P19*P25+S5*40.-C5*1.39-EXT
      R32=P12*40.+P11*(P27+1.39)+P25*P6-P24*P10
      Y1=P19*P14+P8*C5+P9*C3
      Y2=-P7+P19*C5
      Y3=-P11*P19+P10*C3-P6*C5
      AJ(1,2)=R22*Y3-Y2*R32
      AJ(2,2)=R32*Y1-Y3*R12
      AJ(3,2)=R12*Y2-Y1*R22
      AJ(4,2)=Y1
      AJ(5,2)=Y2
```

```
      AJ(6,2)=Y3
      Q1=S2*S3
      Q18=S5*C2
      Q19=S6*C4
      Q25=C4*Q1
      Q26=C3*C5
      Q30=C5*C2
      Q33=C5*18.
      Q34=C5*40.
      Q45=18.*P19
      X1=P14*Q25-P10*Q18-Q26*S2*S6+P9*Q1+C6*C2*C4
      X2=-Q30*S4+S5*C3*S2+Q25*C5
      X3=P10*Q1-P11*Q25+Q19*C2+Q26*S2*C6+Q18*P9
      R11=-Q43*P8-C3*18.*P9-Q34*S6-P14*(Q45+1.39)
      R21=P7*18.-Q33*P19+S5*40.-C5*1.39-EXT
      R31=Q33*P6-P24*P10+Q34*C6+P11*(Q45+1.39)
      AJ(1,1)=R21*X3-X2*R31
      AJ(2,1)=R31*X1-X3*R11
      AJ(3,1)=R11*X2-X1*R21
      AJ(4,1)=X1
      AJ(5,1)=X2
      AJ(6,1)=X3
C AJ IS NOW THE JACOBIAN
      IF(T(5)+1.3) 300,299,299
300   DO 301 I=1,6
      DO 301 J=1,4
301   AJ(J,I)=AJ(J+1,I)
      DO 302 I=1,4
      AJS(I,1)=AJ(I,1)
      AJS(I,2)=AJ(I,3)
      AJS(I,3)=AJ(I,5)
302   AJS(I,4)=AJ(I,6)
      NAJ=IACSW(4)
      IF(NAJ.EQ.0) GO TO 305
      WRITE(3,102) ((AJS(I,J),J=1,4),I01,4)
      WRITE(3,101)
305   CALL MINV10(AJS,4,IF)
      NI=IACSW(5)
      IF (NI.EQ.0) GO TO 306
      WRITE(3,102) ((AJS(I,J),J=1,4),I=1,4)
      WRITE(3,101)
306   DO 303 II=1,4
      DO 303 J=1,4
      I=5-II
303   AT(J,I+1)=AJS(J,I)
      DO 304 J=1,6
      AT(6,J)=AT(4,J)
      AT(5,J)=AT(3,J)
      AT(4,J)=0.
      AT(3,J)=AT(2,J)
      AT(2,J)=0.
      AT(J,1)=0.
304   AT(J,6)=0.
      AT(2,1)=-C6/40.*C5
      AT(3,1)=-S6*.025
      RETURN
299   NAJ=IACSW(4)
      IF (NAJ.EQ.0) GO TO 20
      WRITE(3,100) ((AJ(I,J),J=1,6),I=1,6)
      WRITE(3,101)
20    CALL MINV10(AJ,6,IF)
      NI=IACSW(5)
      IF (NI.EQ.0) GO TO 21
      WRITE(3,100) ((AJ(I,J),J=1,6),I=1,6)
      WRITE(3,101)
100   FORMAT(6F12.6)
101   FORMAT(///////////)
102   FORMAT(4F12.6)
21    DO 10 I=1,6
      DO 10 J=1,6
      AT(I,J)=AJ(I,J)
10    CONTINUE
      RETURN
      END
```

```
C                     MINV10
C   MATRIX INVERSION SUBROUTINE USING GAUSS-JORDAN METHOD
C   CALLING SEQUENCE:    CALL MINV10(A,N,IF)    WHERE
C         A IS MATRIX TO BE INVERTED
C         N IS DIMENSION OF MATRIX (UP TO 10)
C         IF RETURNS EQUAL TO 1 IF MATRIX IS SINGULAR
C         ON RETURN, A IS THE INVERTED MATRIX
C
C
          SUBROUTINE MINV10(A,N,IF)
          INTEGER P
          DIMENSION P(10),B(10),C(10,10),A(1,1)
C         LOOP THROUGH ROWS, CONSTRUCTING INVERSE
          DO 17 IP=1,N
          P(IP)=0.0
          B(IP)=0.0
          DO 16 JP=1,N
16        C(IP,JP)=0.0
17        CONTINUE
          DO 500 K=1,N
          BIGA=0.0
          DO 20 I=1,N
          DO 25 IP=1,N
C IF ROW USED BEFORE,SKIP IT
          IF (I-P(IP)) 25,20,25
25        CONTINUE
C IS THIS ELEMENT LARGER THAN THE CURRENT BIGA?
          IF (ABS(BIGA)-ABS(A(I,1))) 10,20,20
10        BIGA=A(I,1)
          IX=I
20        CONTINUE
          IF (BIGA) 30,35,30
35        IF=1
          RETURN
30        P(K)=IX
          B(IX)=1./BIGA
          DO 50 ID=1,N
50        A(IX,ID)=A(IX,ID)/BIGA
C OPERATE ON OTHER ROWS
          DO 60 IS=1,N
          IF(IS-IX) 59,60,59
59        FAC=A(IS,1)
          DO 65 JS=1,N
65        A(IS,JS)=A(IS,JS)-A(IX,JS)*FAC
          B(IS)=-B(IX)*FAC
60        CONTINUE
          DO 100 M=1,N
          NM1=N-1
          DO 99 NI=1,NM1
          A(M,NI)=A(M,NI+1)
99        CONTINUE
          A(M,N)=B(M)
100       CONTINUE
500       CONTINUE
C PERMUTE ROWS
          DO 600 I=1,N
          DO 599 J=1,N
          IPM=P(I)
          C(I,J)=A(IPM,J)
599       CONTINUE
600       CONTINUE
C PERMUTE COLUMNS
          DO 700 I=1,N
          DO 699 J=1,N
          JPM=P(J)
          A(I,JPM)=C(I,J)
699       CONTINUE
700       CONTINUE
          RETURN
          END
```

Having thus described our invention we claim:

1. Motion controlling apparatus comprising a first element controllable in at least two dimensions, a servo loop including said controllable element which directs motions of said controllable element in an environment, said servo loop comprising means for sensing interactions between said controllable element and said environment to provide sensory information, and task-related transfer function means for utilizing said sensory information to control the trajectory of said controllable element, whereby said controllable element produces motion, force and torque appropriate to the accomplishment of a predetermined task.

2. Motion controlling apparatus comprising a first element controllable in at least two dimensions, a first servo loop including said controllable element which directs motions of said controllable element in an environment, a second servo loop including, in addition to the said first servo loop means for sensing interactions between said controllable element and said environment to provide sensory information, an accommodation branch including task-related tranfer function means for utilizing said sensory information to constrain the performance of said first servo loop to a desired task by controlling the trajectory of the controllable element, whereby said controllable element produces motion, force and torque appropriate to the accomplishment of a predetermined task.

3. Motion controlling apparatus comprising a first element controllable in at least two dimensions, said controllable element having at least two controllable degrees of freedom, said controllable degrees of freedom being expressed in a first coordinate system, said controllable element having at least two output motions, said output motions being expressed in a second coordinate system, a servo loop including said controllable element, means for performing transformations between said first coordinate system and said second coordinate system, said servo loop directing motions of said controllable element in an environment, said servo loop comprising means for sensing interactions between said controllable element and said environment to provide sensory information, and task-related transfer function means for utilizing said sensory information to control the trajectory of said controllable element, whereby said controllable element produces motion, force and torque appropriate to the accomplishment of a predetermined task.

4. Motion controlling apparatus comprising a first element controllable in at least two dimensions, said controllable element having at least two controllable degrees of freedom, said controllable degrees of freedom being expressed in a first coordinate system, said controllable element having at least two output motions, said output motions being expressed in a second coordinate system, a first servo loop including said controllable element, means for performing transformations between said first coordinate system and said second coordinate system, said first servo loop directing motions of said controllable element in an environment, a second servo loop including, in addition to the said first servo loop, means for sensing interactions between said controllable element and said environment to provide sensory information, an accommodation branch including task-related transfer function means for utilizing said sensory information to constrain the performance of said first servo loop to a desired task by controlling the trajectory of said controllable element, whereby said controllable element produces motion, force and torque appropriate to the accomplishment of a predetermined task.

5. Apparatus according to claim 3 wherein said servo loop includes resolved motion rate control transfer function apparatus adapted to accomplish said transformation between said first coordinate system and said second coordinate system to provide input commands to the said controllable element proportioned according to the relationship between input motions, forces and torques expressed in said first coordinate system, and desired output motions, forces and torques expressed in said second coordinate system, whereby a command proportioned to desired output motions, forces and torques will be converted to commands which will cause said controllable element to perform said desired motions, forces and torques.

6. Apparatus according to claim 4 wherein said second servo loop includes resolved motion rate control transfer function apparatus adapted to accomplish said transformation between said first coordinate system and said second coordinate system to provide input commands to the said controllable element proportioned according to the relationship between input motions, forces and torques expressed in said first coordinate system, and desired output motions, forces and torques expressed in said second coordinate system, whereby a command proportioned to desired output motions, forces and torques will be converted to commands which will cause said controllable element to perform said desired motions, forces and torques.

7. Apparatus according to claim 1 wherein said servo loop includes in series with said task-related transfer function apparatus, additional transfer function and sensing apparatus adapted to convert sensed interactions between said controllable element and its environment into signals representative of said interactions.

8. Apparatus according to claim 2 wherein said second servo loop includes
   in series with said task-related transfer function apparatus,
   additional transfer function and sensing apparatus adapted to convert sensed interactions between said controllable element and its environment into signals representative of said interactions.

9. Apparatus according to claim 3 wherein said sensing apparatus is located on said controllable element and acts to sense interactions between said controllable element and said environment into signals representative of said interaction,
   said signals being processed by transfer function apparatus in said servo loop
   so as to express said signals in said second coordinate system.

10. Apparatus according to claim 4 wherein said sensing apparatus is located on said controllable element and
   acts to convert sensed interactions between said controllable element and said environment into signals representative of said interaction,
   said signals being processed by transfer function apparatus in said second servo loop
   so as to express said signals in said second coordinate system.

11. Apparatus according to claim 3 wherein said sensing apparatus is located in said environment, and acts to sense interactions between said controllable element and said environment into signals representative of said interaction,
   said signals being processed by transfer function apparatus in said servo loop
   so as to express said signals in said second coordinate system.

12. Apparatus according to claim 4 wherein said sensing apparatus is located in said environment, and
   acts to convert sensed interactions between said controllable element and said environment into signals representative of said interaction,
   said signals being processed by transfer function apparatus in said second servo loop so as to express said signals in said second coordinate system.

* * * * *